Sept. 25, 1956 W. C. HUEBNER 2,764,500

METHOD AND APPARATUS FOR REPRODUCING IMAGES

Filed Oct. 4, 1951 6 Sheets-Sheet 1

INVENTOR.
WILLIAM C. HUEBNER
BY Hudson, Boughton,
Williams, David & Hoffmann
ATTORNEYS INVENTOR.
WILLIAM C. HUEBNER
BY Hudson, Boughton,
Williams, David & Hoffmann
ATTORNEYS INVENTOR.
WILLIAM C. HUEBNER
BY Hudson, Boughton,
Williams, David & Hoffmann.
ATTORNEYS Sept. 25, 1956 W. C. HUEBNER 2,764,500

METHOD AND APPARATUS FOR REPRODUCING IMAGES

Filed Oct. 4, 1951 6 Sheets-Sheet 4

INVENTOR.
WILLIAM C. HUEBNER
BY Hudson, Boughton, Williams, David & Hoffmann
ATTORNEYS INVENTOR.
WILLIAM C. HUEBNER
BY Hudson, Boughton, Williams, David & Hoffmann
ATTORNEYS INVENTOR.
WILLIAM C. HUEBNER
BY Hudson, Boughton, Williams, David & Hoffmann
ATTORNEYS United States Patent Office 2,764,500

Patented Sept. 25, 1956

2,764,500

METHOD AND APPARATUS FOR REPRODUCING IMAGES

William C. Huebner, Mamaroneck, N. Y., assignor to The Huebner Company, Dayton, Ohio, a corporation of Ohio Application October 4, 1951, Serial No. 249,753

11 Claims. (Cl. 117—17.5)

This invention relates to a novel and useful process and apparatus for reproducing or printing images on paper or other suitable receiving material.

More particularly the invention relates to a novel and useful process and apparatus for reproducing or printing successively and directly on paper or other suitable receiving materials complete single images such as letters, numerals, symbols, signs, characters, pictures and the like.

In my prior Patent 2,180,417 issued November 21, 1939, I disclosed and claimed an apparatus for photographically composing type characters and wherein single characters or images are selected by means of a keyboard and are composed photographically in lines on a light sensitive film or member with said film or member, after photographic development, being used to produce a printing plate or cylinder to be used subsequently in a printing couple.

The main object of the invention is to provide a process and apparatus for directly and successively reproducing or printing on paper or other suitable receiving materials complete single images, such as letters, characters, symbols, pictures and the like, which do not employ a great number of moving mechanical parts subject to wear, misalignment, etc., which produce inaccuracies but utilize light rays and electrical devices responsive to such rays and acting to directly reproduce and print on the paper or other suitable receiving materials the complete image desired with each image being completely and instantaneously reproduced in its entirety.

Another object of the present invention is to provide improved and novel process and apparatus for directly and successively reproducing or printing on paper or other suitable receiving material selected single complete and instantaneously produced images, such as letters, symbols, characters and the like and which process and apparatus are improvements over the process and apparatus for photographically composing images that are subsequently after photographic development produced on printing plates or cylinders, an illustration of such last mentioned process and apparatus being contained in my said Patent 2,180,417.

Another object is to provide an improved and novel process and apparatus as referred to in the last named object and wherein since the images are reproduced or printed successively and directly on paper or other suitable receiving material with the individual images each being simultaneously and completely produced the necessity of photographically composing the images and then developing the same and thereafter producing printing plates or cylinders from the composed and developed images to reproduce or print the images is avoided.

Another object is to provide novel and improved process and apparatus for directly and successively in any desired order reproducing or printing on paper or other suitable receiving material various collections of single images such as letters, symbols, characters and the like with each image being simultaneously produced in complete form without scanning operations, and wherein movable type arms are not employed or impact between the type images and a carbon ribbon bearing against the paper or other material is not required such as is the case in apparatus comparable to typewriters and the like.

A still further object is to provide a novel and useful process and apparatus for reproducing or printing images successively and directly on paper or other suitable receiving materials such as referred to above and wherein the apparatus can be easily and quickly adapted to reproduce all manner of images as well as many different sizes of the same image, thus providing an apparatus having an extremely wide range of utility.

A still further object is to provide improved and novel process and apparatus such as referred to in the last named object and which can be utilized readily and simply and selectively for successively and directly reproducing or printing on paper or other suitable receiving materials single images, such as letters, characters or symbols employed in various languages using different styles and numbers of letters or characters as, for instance, languages employing Arabic characters such as English and similar languages, or languages employing characters other than Arabic, such as certain Oriental and Middle Eastern languages.

A still further object is to provide an apparatus such as referred to in the preceding objects and which is so designed and functions as to be readily, quickly and easily adapted for reproducing or printing directly and successively on paper or other suitable materials images such as the code symbols or characters employed in such machines as calculators, computing and other business machines, as well as message transmitting or coding machines.

A further and important object is to provide a method and apparatus such as hereinbefore referred to and by which the single images are each reproduced simultaneously in its entirety and not in piece-meal form such as is done in apparatuses and processes requiring scanning of the image copy.

Another object is to provide a method and apparatus such as hereinbefore referred to and whereby the reproducing material forming the reproduced images is molecularly fused or integrated with the receiving material.

Further and additional objects and advantages will become apparent hereinafter during the detailed description of embodiments of the invention which is to follow.

Specifically the invention contemplates reproducing or printing directly and successively on paper or other suitable receiving material various desired single images, such as letters, characters, symbols, pictures, code signs and the like by passing light rays simultaneously through the entire image to be reproduced and projecting the same upon a target containing light responsive electrical devices which are energized by the light rays in an arrangement or configuration corresponding to the shape of the entire image. This energization of the devices controls the energization of a plurality of electrical circuits containing multiple spaced electrodes which create electrostatic fields of force corresponding to the shape of the entire image and extending across an atmospheric gap between the electrodes. A continuous cloud of reproducing material, such as a mist of fine particles, smoke, atomized liquid and the like, is passed through said atmospheric gap and is acted upon by said electrostatic fields of force and caused thereby to deposit on and be integrated with the paper or other receiving material located in the gap to reproduce instantly thereon the desired and entire image.

Referring to the accompanying drawings.

Figure 1:
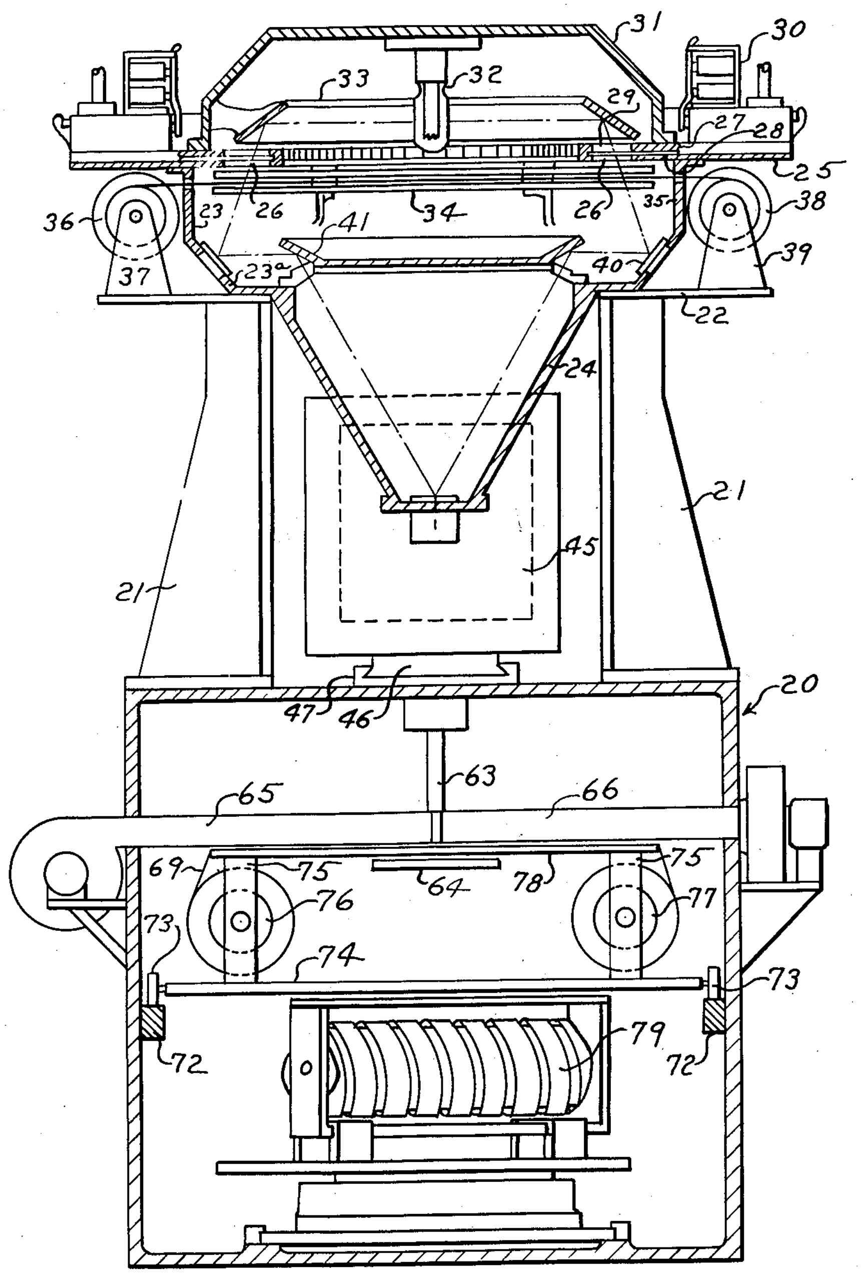
Fig. 1 is a longitudinal sectional view through an apparatus embodying the invention, the section being taken on irregular line 1—1 of Fig. 2 looking in the direction of the arrows.
Figure 13:
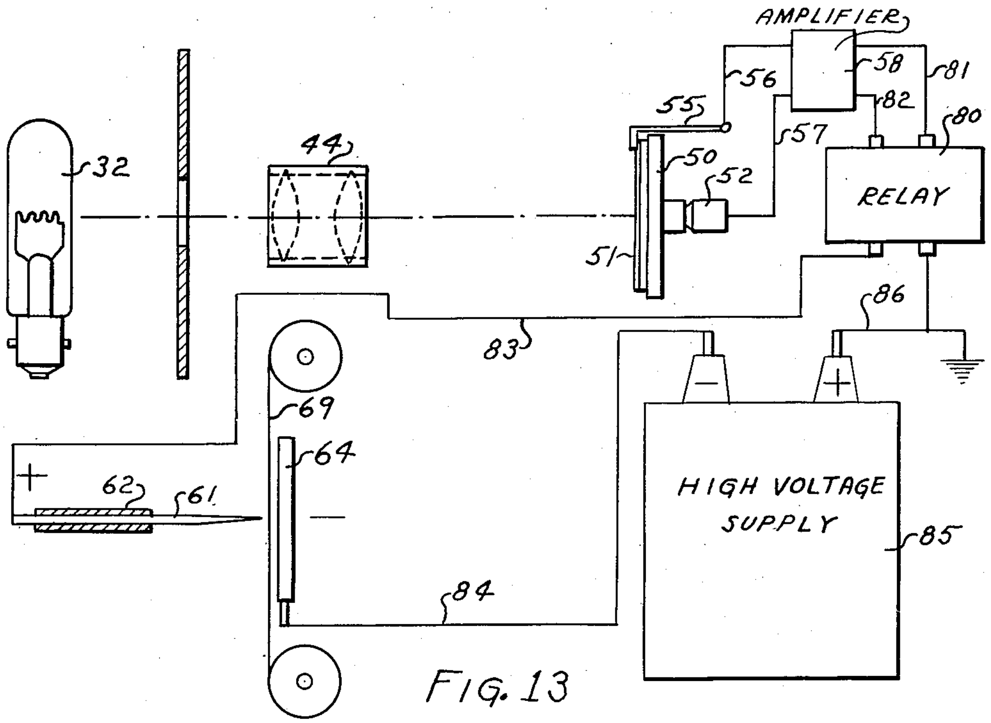
Figure 12:
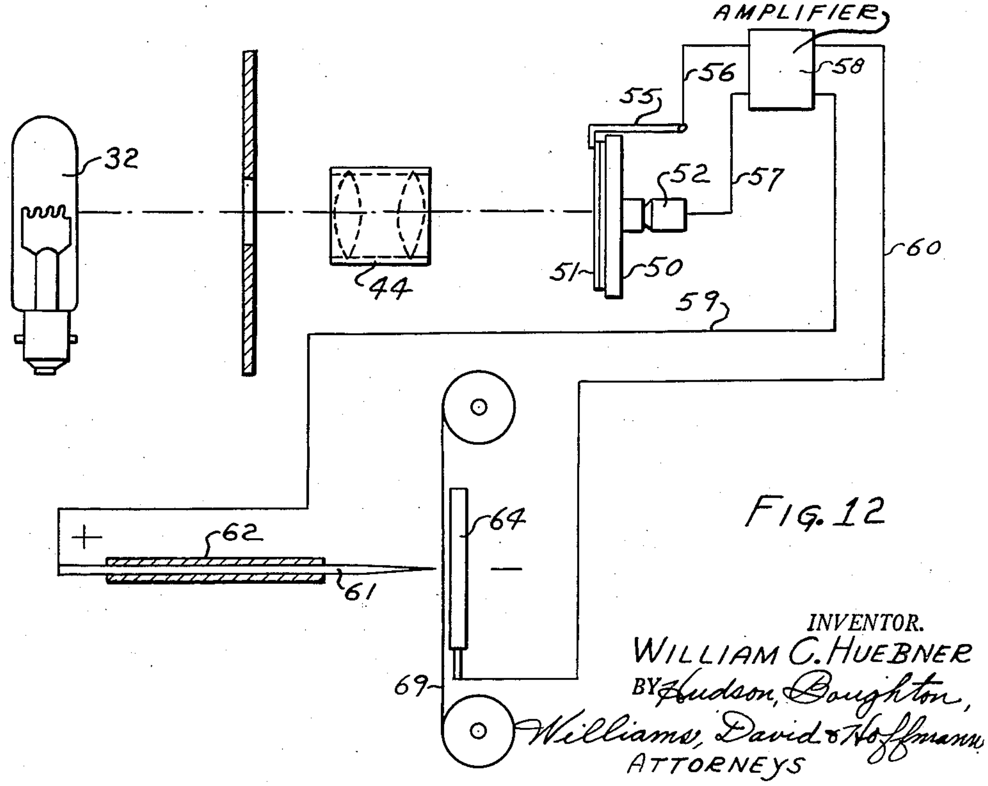
Fig. 12 is a diagrammatic illustration of the optical system, target and electrical circuit which may be utilized in the device.
Figure 14:
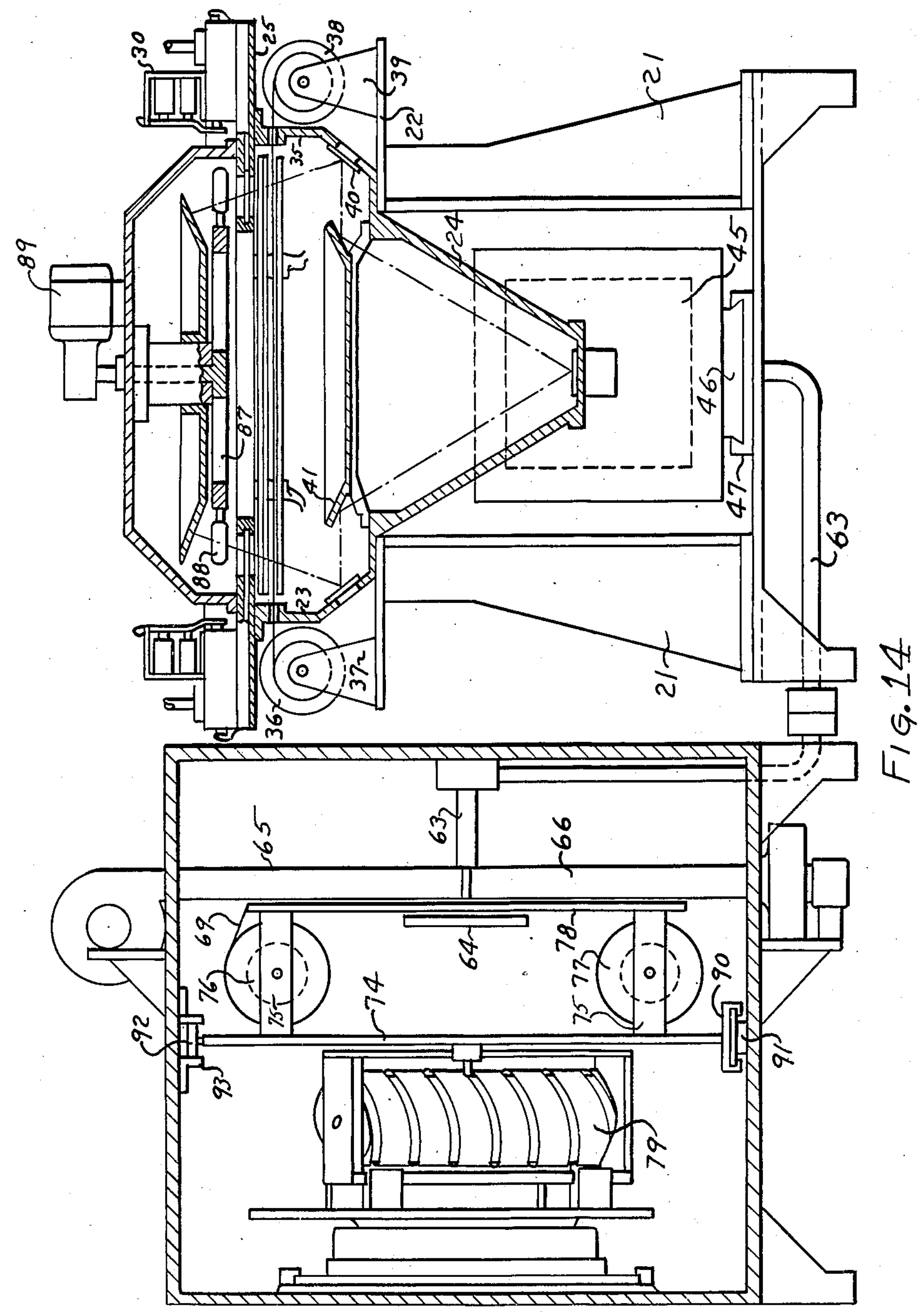

Fig. 13 is a view similar to Fig. 12 but illustrating a different form of electrical circuit, and Fig. 14 is a view similar to Fig. 1 but wherein the lower part of the apparatus is turned 90° with respect to the upper part instead of being beneath the same, so that the web of paper or other image receiving material passes between the discharge elements and the attraction element in a vertical plane instead of a horizontal plane.

The form of apparatus shown in Figs. 1 to 13 inclusive comprises a base indicated generally at 20 and containing mechanism later to be referred to. The base 20 supports on its upper side vertically extending uprights 21 illustrated as four in number.

The uprights 21 support on their upper ends a plate 22 which is secured to the uprights 21 in any preferred manner and which acts as the support for reels later to be referred to. A housing 23 is supported on the plate 22 and has a centrally located downwardly extending conical portion 24 which projects through an opening in the plate 22 and between the uprights 21. The housing 23 and its depending conical portion 24 will be referred to hereinafter as the optics housing of the apparatus.

The upper end of the housing 23 is provided with an annular flange which supports a ring plate 25 which will be referred to hereinafter as a shutter plate. The shutter plate 25 is provided with a circular series of circumferentially spaced openings, two of which are shown in Fig. 1 and are indicated at 26. The shutter plate 25 supports on its upper side a plurality of shutter housings 27 which correspond in number to the openings 26 and which are provided on their sides adjacent to the plate 25 with channels extending radially of the plate 25 and slidably guiding shutters 28, it being understood that the number of shutters 28 corresponds to the number of openings 26 in the plate 25.

Each shutter housing 27 is provided with an opening 29 registering with the corresponding opening 26 in the plate 25. Each shutter 28 is slidable radially inwardly and outwardly with respect to the plate 25 and housing 27 and is closed in its innermost position and open in its outermost position, at which latter time light is free to pass through the registering openings 29 and 26. The shutter arrangement as thus far described is fully illustrated and described in my Patent 2,402,752, issued June 25, 1946, and hence need not be described in greater detail herein.

While the shutters 28 may be operated to closed and opened positions by various means, for sake of illustration said shutters will be considered herein as operated by electrical-pneumatic devices indicated generally at 30 and corresponding in number to the number of shutters and also clearly illustrated and described in my said Patent 2,402,752 and therefore requiring no detailed description herein.

It will be understood that the shutters 28 and the electrical-pneumatic devices 30 are arranged in a circumferential series and correspond in number to the number of circularly arranged images on the image web later to be referred to. The electrical-pneumatic devices can be selectively actuated by the operator by suitable keyboard-controlled means, such as that shown in my hereinbefore referred to Patent 2,180,417 and hence not illustrated herein.

A dome-like cover 31 is supported by the shutter housings 27 and the plate 25, it being understood that said cover 31, shutter housings 28 and plate 25 are properly secured together against relative displacement with respect to each other and with respect to the annular flange of the optic housing 23.

The dome cover 31 supports centrally thereof a light source 32 which may be any suitable source, such as an electric light bulb of selected capacity. Surrounding the light source 32 and supported by suitable internal brackets within the dome cover 31 is a reflector ring 33 which is concentric to the light source 32 and has its underside overlying the openings 29 and 26 in the shutter guides and plate 25 so that the light rays from the source 32 are reflected by the reflecting ring 33 to all of the openings 29 in the shutter guides 27, wherefore as the various shutters are selectively opened by the operator the light rays can pass through correlated openings 26 in the plate 25 as indicated by dot and dash lines in Fig. 1.

Within the optical housing 23 and below the plate 25 a pair of parallel vertically spaced apart horizontal water white glass plates 34 are supported by suitable brackets carried by the housing 23 and between said glass plates 34 extends the web 35 which carries the plurality of series of images to be reproduced. The web 35 may take various forms but is shown herein as a continuous elongated web which is unwound from a supply roller 36 mounted in brackets 37 carried by the plate 22 and is rewound upon a rewind roller 38 mounted in brackets 39 also carried by the plate 22.

The optic housing 23 is provided at diametrically opposite points with slots through which the web 35 extends and which slots align with the space between the glass plates 34 as clearly shown in Fig. 1. The web 35 is provided with a plurality of series of characters, images, symbols or the like with those of each series arranged in a circle so as to be positioned beneath the openings 26 in the plate 25.

It will be understood that the different series of images on the web 35 can vary as to character as, for instance, the images of one series may be Arabic letters, those of another series may be a different type letter, while still another series may have images representing arbitrary symbols of various kinds which it is desired to reproduce.

It will also be understood that each series of images on the web 35 can contain a plurality of different images corresponding in number to the openings 26 and to the number of shutters 28.

It will further be understood that in place of the continuous web illustrated and on which are a plurality of series of images of various kinds, single sheets each containing a series of images which are to be reproduced can be substituted for the web and inserted between the plates 34 and in registration with the openings 26 in the plate 25.

It will also be understood that the operator when the apparatus is equipped with the web 35 can move said web to bring any desired series of characters into registered position with the openings 26 merely by proper manipulation of the reels 36 and 38.

The optic housing 23 below the glass plates 34 is provided with an inwardly inclined circular wall portion 23*a*, with the angularity of said portion being in predetermined relationship to the angularity of the reflector ring 33. The circular wall portion 23*a* mounts a plurality of circularly spaced reflecting mirrors 40, each cooperating with one of the openings 26 and with said mirrors corresponding in number to said openings.

Figure 2:
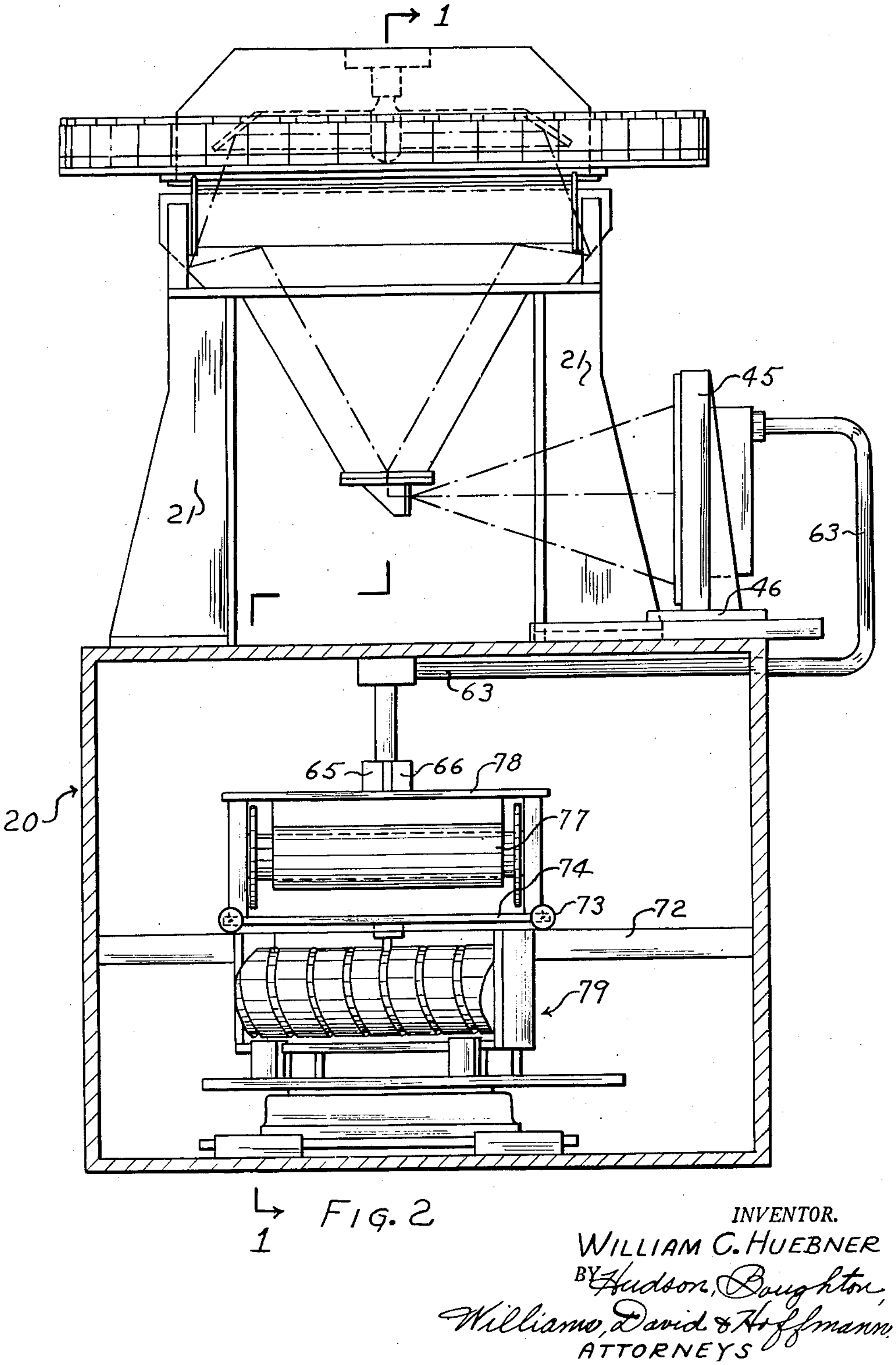
Fig. 2 is a view of the apparatus taken at right angles to Fig. 1 with the upper part of the apparatus being shown in elevation and certain of the parts illustrated in Fig. 1 being omitted and the lower part in section.

Supported within the optic housing 23 on suitably spaced brackets is a reflecting ring 41 disposed at a predetermined angle with respect to the angularity of the mirrors 40 and provided with a plurality of circularly spaced ground mirror surfaces, corresponding in number to the mirrors 40 and arranged in proper optical relationship thereto so that light rays reflected from the mirrors 40 to the reflecting ring 41 will be reflected downwardly within the conical portion 24 of the optic housing 23 by said ground mirror surfaces as indicated by the dot and dash lines in Figs. 1 and 2.

Figures 6, 7, 8, 9, 10, 11, 11A:
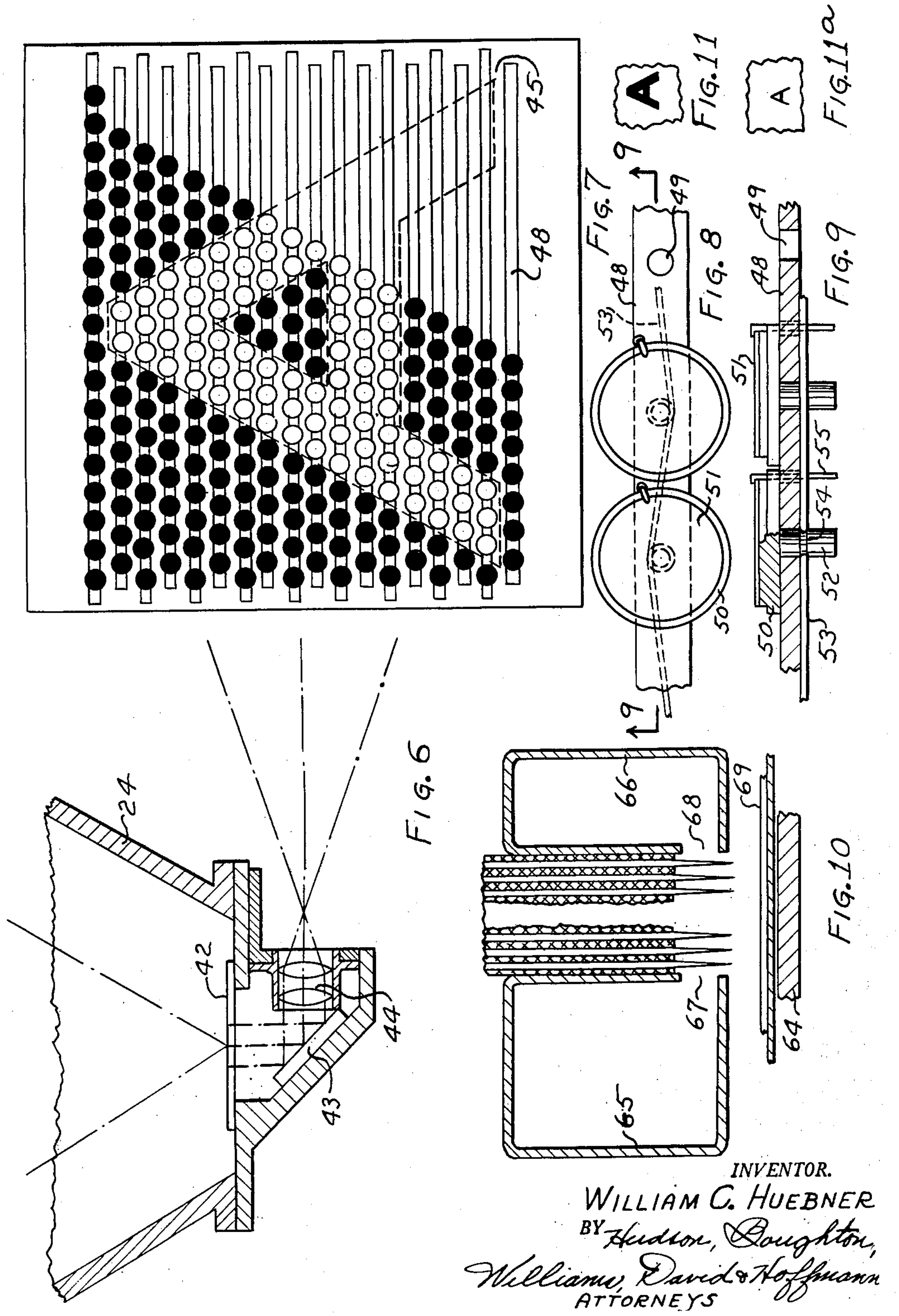
Fig. 6 is a fragmentary sectional view on a larger scale than Fig. 2 and illustrating the optical system of the apparatus and showing diagrammatically by dot and dash lines the path of the light rays and their effective angles.
Fig. 7 is a front elevational view of the target shown in the preceding views and which receives the light rays and which target includes the light responsive self-generating electrical devices that control the electrostatic fields of force for reproducing or printing the image.
Fig. 8 is an enlarged elevational view of a portion of the target shown in Fig. 7 and includes two of the electrical devices of Fig. 7.
Fig. 9 is a view partially in section and partially in elevation and is taken substantially along line 9—9 of Fig. 8 looking in the direction of the arrows.
Fig. 10 is a view similar to Fig. 4 but on a larger scale and illustrates the attraction element which is not shown in Fig. 4 and also shows the paper or other receiving material which receives the reproduction of the image as passing through the space or gap between the discharge elements and the attraction element.
Fig. 11 illustrates an example of image as reproduced on the paper or other receiving material while Fig. 11*a* also illustrates the reproduced image showing the same of a smaller size than in Fig. 11.

The said conical portion 24 of the optic housing 23 is provided at its lower end with an optical device comprising a focusing plate or focal plane 42, a reflector mirror 43 and a lens 44, see Fig. 6. It will be understood that when a selected shutter 28 is opened the light rays passing through the image aligned with the particular openings 29 and 26 will be reflected in the configuration of the image by the mirrors 40 and the reflecting ring 41 onto the focal plate 42 from whence the reflected image strikes the 45° reflecting mirror 43 and passes horizontally through the lens 44 onto a planular surfaced target indicated generally at 45. The target 45 is adjustably supported at its lower edge by a dove-tail tongue 46 slidable in a dove-tail groove 47 mounted on the base 20 intermediate the uprights 21, wherefore the target can be adjusted horizontally toward or away from the lens 44 of the optical device to vary the size of the reflected image striking the target.

The target 45 is illustrated and in this instance includes a plurality of parallel horizontally extending vertically spaced bars 48, each of which is provided with a plurality of openings 49 spaced longitudinally of the bar, see Figs. 7, 8 and 9. As shown in Fig. 7, the bars 48 are so arranged that their ends are staggered with respect to each other for a reason soon to become apparent. Each bar 48 mounts a plurality of buttons 50 which on their exposed or outer side have a light sensitive electron emitting coating such as a selenium coating 51, with all of the coatings being located in the same planular surface. Each button 50 on its inner or non-exposed side is provided with a centrally located pin or stud 52 which is inserted into an opening 49 in the bar and the pin or stud and the button are held in position on the bar 48 by means of a retaining wire 53 extending beneath the bar 48 and encircling the pin or stud 52 which is provided with an annular groove 54 that receives the retaining wire 53, see Figs. 8 and 9.

The selenium coating 51 of each button is connected to an electrically conductive whisker 55 which extends through an insulated opening in the bar 48 while the stud or pin 52 of each button is adapted to be connected to one side of an electrical circuit, the opposite side of which is connected to said whisker as will later be explained.

As illustrated diagrammatically in Fig. 12, the whisker 55 of each button 50 is connected to a wire 56 while the stud 52 of each button is electrically connected to a wire 57 of an electrical circuit, it being understood that there are as many independent electrical circuits as there are buttons 50. The wires 56 and 57 extend to an amplifier 58 which may be of any suitable commercially known form and of the desired capacity.

A wire 59 extends from the amplifier 58 and constitutes the positive side of the circuit while the wire 60 extending from the amplifier 58 constitutes the negative side of the circuit. Although reference will be made hereinafter in greater detail, the manner in which the selenium coating 51 functions will now be referred to briefly. The light rays in the shape of the entire image passing through the lens 44 and all simultaneously striking the target 48 will act simultaneously on the selenium coatings on certain of the buttons 50 of the target (the buttons thus subjected defining the entire and complete configuration of the image to be reproduced) and such light rays acting on the selenium coatings cause an emission of electrons producing minute strength electrical currents which are amplified by the amplifiers 58 and flow at substantial strength through the wires 59 and 60 of the multiplicity of separate circuits.

As already stated, there will be as many electrical circuits as there are buttons 50 on the target and the positive side of each of said circuits, i. e., the wire 59, is electrically connected to a needle-like electrode or discharge element 61. Consequently there will be as many of the elements 61 as there are buttons 50 and said elements 61 will be closely grouped together in an arrangement corresponding to the buttons 50 of the target with the elements 61 separated from each other by insulating sleeves 62 that do not extend, however, over the pointed free ends of the elements 61 and which ends are all located in a single plane. As illustrative the target may be considered as containing a plurality of buttons 50 arranged substantially in a rectangle as indicated in Fig. 7 and there will be a corresponding number of needles or elements 61 similarly arranged but grouped together in a compact small rectangular area.

All of the wires 59 are contained within a protective flexible sheath-like cable 63. The wires 60 constituting the negative side of the circuits and extending from the amplifiers 68 may all be connected to a single wire which extends to a common plate-like electrode or attraction element 64 spaced from the points of the elements 61 and arranged in a plane parallel to the plane of the pointed free ends of the elements 61 and to which in this instance the elements 61 are perpendicular, see Figs. 10 and 12.

Figure 3:
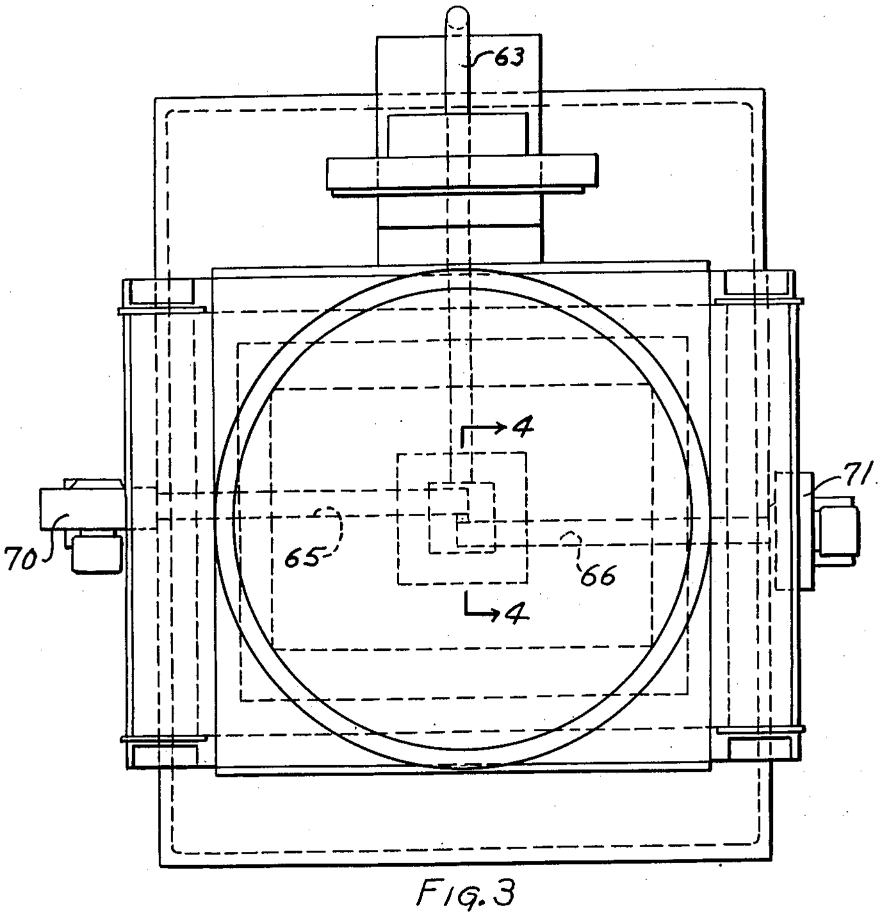
Fig. 3 is a top plan view of Fig. 1 with the top portion of the apparatus containing the shutters, light and reflector ring removed.
Figure 5:
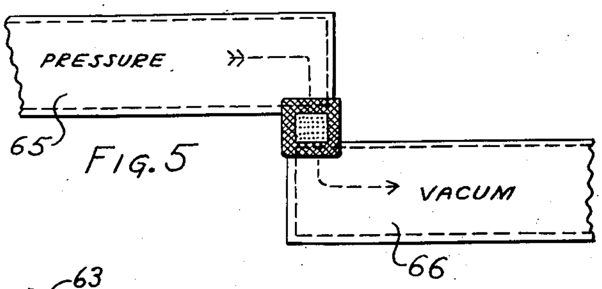
Fig. 5 is a detached partial plan and partial sectional view taken on line 5—5 of Fig. 4 looking in the direction of the arrows.
Figure 4:
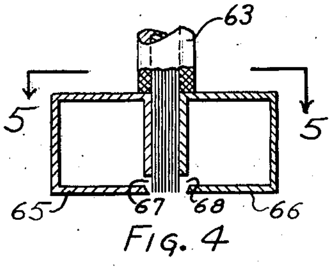
Fig. 4 is an enlarged detached sectional view taken substantially on line 4—4 of Fig. 3 looking in the direction of the arrows.

Referring to Figs. 3, 4 and 5 it will be seen that the compact group of needles or elements 61 which are the discharge electrodes are located between conduits 65 and 66 and more specifically between the inner ends of said conduits and at a location within the base 20. The conduits 65 and 66 are provided with openings 67 and 68, respectively, with the ends of the needles or elements 61 located in the space between said openings, see Figs. 4 and 10. Conduit 65 is a pressure conduit and conducts a continuous cloud of reproducing material such as smoke, mist or atomized liquids to the space surrounding the points of the needles or elements 61 by means of the opening 67, and hence such continuous cloud of reproducing material passes between the needle points and will be acted upon by the electro lines of force extending between said points and the attraction plate 64 and be deposited thereby on the receiving material 69 which passes between the discharge needles and the attraction electrode 64 as clearly indicated in Fig. 10 in the reproduced configuration of the entire image.

As will be pointed out more fully hereinafter the energization of the various needles or elements 61 singly or in groups will cause the deposit of the reproducing material on the receiving material 69 instantly to be in the configuration of the entire and complete image to be reproduced. The conduit 66 is a suction conduit and therefore the continuous cloud of reproducing material is passed through the fields of force while any excess not deposited on the receiving material 69 will be drawn off into the conduit 66 through the opening 68.

A device for creating the continuous cloud of reproducing material and for forcing it under pressure through the conduit 65 past and between the needle points and through the field of force is schematically indicated at 70, it being understood that said device may take various forms and will include pressure producing means for forcing the cloud of reproducing material through and out of the conduit 65 and into the conduit 66.

A suitable suction device 71 is connected to the conduit 66 to provide the drawing suction for taking away the excess reproducing material, and it will be understood that, if desired, this withdrawn reproducing material may be returned by a suitable conduit to the device 70 to again be circulated through the apparatus.

The housing 20 on the inner side of its side walls and below the conduits 65 and 66 is provided with parallel rails 72 on which rotate the rollers 73 of a platform or carriage formed of a rectangular frame and indicated at 74. The carriage 74 is provided with spaced pairs of upstanding supporting brackets 75, with the left hand pair of such brackets, as viewed in Fig. 1, rotatably mounting a reel 76 while the right hand pair of brackets rotatably mounts a reel 77. In this instance reel 76 has wound thereon the roll of image receiving material 69 which passes over a supporting plate 78 mounted on the upper ends of the brackets 75 and is wound upon the reel 77.

It will be understood that the single complete images are successively produced instantly in their entire form on the material 69, with the single images arranged in a line formation and that the spacing between the images in each line is effected by movement of the carriage 74. It will also be understood that the spacing between lines of images is effected by the movement of the material 69 which unwinds from the reel 76 and is wound up on the reel 77. Any suitable means for rotating said reels for this purpose can be used.

The movement of the carriage 74 is effected by justification mechanism indicated generally at 79 but not described herein since it forms no part of the present invention.

The manner in which the apparatus thus far described functions to reproduce instantly single complete images successively on the receiving material will now be described. Assuming that the web 35 containing the different series of circularly arranged images is properly positioned and that the particular series of images to be reproduced is composed of Arabic letters and that the particular image being reproduced is the letter A, the light source 32 being illuminated, the operator opens the shutter 28 that overlies the letter A in the series of images on on the web 35, whereupon the light rays reflected by the reflector ring 33 pass through the image or letter A on the web 35 onto the correlated reflecting mirror 40 from whence they go to the reflecting ring 41 and thence to the focal plate 42, the reflector mirror 43 and through the lens 44 and onto the planular target 45 in the complete configuration of the image. The web 35 is opaque while the images thereon which are to be reproduced are transparent and hence the light beams passing through the image and projected onto the target have the configuration of the complete transparent image.

As already explained, the target is composed of a plurality of small selenium coated buttons. The light rays in the configuration of the entire image illuminate simultaneously the selenium buttons located correspondingly to the entire image configuration to cause the buttons thus illuminated simultaneously to emit a flow of electrons and produce electric currents at the same instant in the individual circuits extending from the illuminated buttons.

The electrical currents in the energized circuits are amplified by the amplifiers 58 in said circuits and hence all the discharge elements 61 corresponding to the illuminated buttons and arranged in the configuration of the complete image and the common attraction element 64 are energized. Therefore the continuous cloud of reproducing material such as smoke, mist or atomized liquid particles forced across and between the points of the discharge electrodes 61 from the pressure conduits 65 is propelled by the electro lines of force extending between the particular elements 61 and the element 64 toward the receiving material 69 and the reproducing is deposited instantly on the receiving material 69 in the configuration of the entire image to be reproduced. It has been found that the reproducing material thus migrated by the lines of force of the fields of force to the receiving material is driven into and is integrated with the latter in what appears to be a molecular fusion between the reproducing and receiving materials. The size of the image thus reproduced can be varied by adjusting the target 45 toward or away from the lens 44 while the density of the reproduced image can be varied by the time interval during which the shutter overlying the image A on the web 35 remains open and the fields of force corresponding to the configuration of the entire image are activated.

As already explained, excess of non-deposited reproducing material is withdrawn through the suction conduit 66. After the image A is thus reproduced simultaneously in its entirety the carriage 74 is moved a single step equivalent to the desired spacing between images in a line of images and then the shutter over the next image to be reproduced is opened to cause the reproduction thereof in the same manner already explained with respect to the letter A.

It will be understood that the target 45 is of such size that the reflected light rays striking the same in the configuration of the entire image to be reproduced cover an area many times greater than will be the area of the reproduced image.

It will be understood that a line formed of single successively reproduced images can be thus obtained by operation of the apparatus and if it is desired to reproduce several lines of images line spacing is obtained by moving the image receiving material 69 a distance equivalent to the desired space between the lines of images. Also, as has been previously referred to, the web 35 contains a plurality of series of circularly arranged images which may be of various characters so that by shifting the web the apparatus can reproduce Arabic letter images, images of other types of letters, symbols, characters, numbers, code signs or various other images.

The circuit shown in Fig. 12 and heretofore described is a simplified one which is suitable for reproducing images, and particularly where the images are to be reproduced with relatively light deposits and in small size as, for example, the reproduced letter shown in Fig. 11*a*.

In Fig. 13 there is shown a circuit which may be used to advantage where the reproduced images are to be of larger size and heavier deposits as illustrated in Fig. 11. The circuit shown in Fig. 13 corresponds to that shown in Fig. 12, insofar as the selenium buttons and their connection to the amplifiers are concerned. In the circuit of Fig. 13 the amplifier 58 is connected to a relay 80 by wires 81 and 82. It will be understood that the current generated by the light beams striking the selenium buttons 50 are amplified by the amplifiers 58 and then actuate the relays 80 to control separate circuits to the discharge and attraction elements or electrodes 61 and 64. Each separate circuit comprises a wire 83 extending from the relay to the discharge element 61 and is indicated in the diagram as the positive side of the circuit. The attraction element or electrode 64 is connected by a wire 84 to the negative side of a source of high voltage current indicated at 85. The positive side of the source 85 is connected by a wire 86 to the relay 80. Consequently the electrical circuit shown in Fig. 13 is capable of producing a much stronger field of force than the circuit shown in Fig. 12, since in the Fig. 13 circuit the field of force is not dependent in strength on the current generated by the selenium button and amplified by the amplifier 58.

The apparatus shown in Fig. 14 is identical with the apparatus previously described, except that the base 20 and the upper portion of the apparatus are slightly modified and the base is turned 90° from its former position. Insofar as the parts of the apparatus shown in Fig. 14 are identical with the parts thereof shown in the previously described views the same reference characters are employed.

In the form shown in Fig. 14 a rotatable light carrying frame 87 provided with a plurality of circumferentially spaced lights 88 is employed in place of the single centrally arranged light of the preceding form. The frame 87 is operatively connected through suitable gearing and shafts to a motor 89 which operates to rotate the frame 87, wherefore the light beams passing through the open shutters are pulsating beams to give a pulsating effect to the electrostatic fields of force for reproducing the image.

It will be noted that the carriage 74 in Fig. 14 extends vertically and is supported at its lower end by a channel-shaped guide member 90 moving on an I-shaped rail 91 while its upper end mounts a roller 92 located between angle-shaped guide rails 93. The purpose of separating the base 20 from the upper part of the apparatus as shown in Fig. 14 is to enable the optical portion of the apparatus to be placed in one location and the reproducing portion of the apparatus in another location with said portions operatively interconnected by the flexible cable 63 as, for instance, the optical portion might be located in one room and the reproduction portion in another room.

Although preferred embodiments of the invention have been illustrated and described herein it will be understood that the invention is susceptible of various modifications and adaptations within the scope of the appended claims.

Having thus described my invention, I claim:

1. The process of reproducing instantly and directly on receiving material while stationary a complete image such as letters, numerals, characters, pictures and the like from image copy having a transparent image area and an opaque non-image area and which comprises passing light from a stationary light source through the entire transparent image area of the image copy in the same instant and while the image copy is stationary thereby producing light rays in the configuration of the entire transparent image area; projecting all of said light rays onto a stationary target having an extended planular surface containing a multiplicity of separate but closely grouped light responsive electron emitting devices thereby eliminating an area of said planular surface corresponding to the entire transparent image area of the image copy, energizing the devices located in the illuminated area, energizing electrical circuits connected to said energized devices and having uniform atmospheric gaps therein, and producing simultaneously a plurality of separate electrostatic fields of force across the atmospheric gaps; and passing a cloud of reproducing material through said fields of force transversely to the lines of force thereof thereby depositing the reproducing material on receiving material stationarily located in the atmospheric gaps and extending transversely to the lines of force of said fields of force, wherefore the entire transparent image area of the stationary copy is reproduced instantly on the receiving material by the deposited reproducing material.

2. The process of reproducing instantly and directly on receiving material while stationary a complete image such as letters, numerals, characters, pictures and the like from image copy having a transparent image area and an opaque non-image area and which comprises passing light from a stationary light source through the entire transparent image area of the image copy in the same instant and while the image copy is stationary thereby producing light rays in the configuration of the entire transparent image area; projecting all of said light rays onto a stationary target having an extended planular surface containing a multiplicity of separate but closely grouped light responsive electron emitting devices thereby illuminating an area of said planular surface corresponding to the entire transparent image area of the image copy, energizing the devices located in the illuminated area, energizing low voltage electrical circuits connected to said energized devices, energizing, in turn, a corresponding number of high voltage electrical circuits controlled by said low voltage electrical circuits and having therein uniform atmospheric gaps, and producing at the same instant a plurality of closely grouped electrostatic fields of force extending across said gaps; and passing a cloud of reproducing material through said gaps transversely to the lines of force of said fields of force thereby depositing the reproducing material on stationary receiving material located in the atmospheric gaps and extending transversely to the lines of force of said fields of force, wherefore the entire transparent image area of the stationary image copy is reproduced instantly on the receiving material by the deposited reproducing material.

3. The process of reproducing on receiving material in line form a series of spaced complete images such as letters, numerals, characters, pictures and the like from image copy containing the separate images arranged in spaced line form and each having a transparent image area and an opaque non-image area wherein each image is reproduced on the receiving material instantly, directly and completely, said process comprising passing light from a stationary light source through the entire transparent image area of a selected image on the image copy while said copy is stationary and the transparent image areas of the remaining images on the copy are rendered impervious to light from said source thereby producing at the same instant light rays in the configuration of the entire transparent image area of the selected image; projecting all of said light rays onto a stationary target having an extended planular surface containing a multiplicity of separate but closely grouped light responsive electron emitting devices thereby illuminating an area of said planular surface corresponding to the entire transparent image area of the selected image of the copy, energizing the devices located in the illuminated area, energizing electrical circuits connected to said energized devices and having uniform atmospheric gaps therein, and producing simultaneously a plurality of separate electrostatic fields of force across the atmospheric gaps; passing a cloud of reproducing material through said fields of force transversely to the lines of force thereof thereby depositing the reproducing material on receiving material while stationary and located in the atmospheric gaps and extending transversely to the lines of force of said fields of force, wherefore the entire transparent image area of the selected image of the copy is reproduced instantly on the receiving material by the deposited reproducing material; then rendering the transparent image area of the selected image impervious to the passage of light thereby terminating the electrostatic fields of force; then moving the receiving material to a position to receive a new deposition thereon spaced from said first deposition; then selecting another image on the copy for the passage of light through the transparent image area thereof and repeating the hereinbefore enumerated steps and effecting deposition of the reproducing material instantly on the receiving material while stationary in the configuration of the entire newly selected image; and repeating the hereinbefore enumerated steps successively for each image on the copy which it is desired to reproduce on the receiving material, wherefore the successive depositions on the receiving material while stationary are each formed instantly in the configuration of the entire selected image of the image copy while stationary.

4. In apparatus for reproducing directly and instantly on receiving material entire complete images such as letters, numerals, characters, pictures and the like and which comprises a plurality of closely grouped needle-like discharge elements mounted with their pointed discharge ends separated but closely grouped together in a predetermined arrangement over a planular area, an attraction element cooperating with each discharge element and spaced from the discharge end thereof to provide an atmospheric gap therebetween, an independent electrical circuit connected to each discharge element and to said attraction element cooperating therewith, means for electrically energizing at the same instant certain of said circuits to produce an electrostatic field of force between each discharge element connected to an energized circuit and its cooperating attraction element and across the atmospheric gap therebetween and including a target having a planular surface provided with a multiplicity of individual light sensitive electron emitting devices corresponding in number to all of said circuits and said discharge elements and grouped in an arrangement corresponding to said discharge elements, with each of said devices being connected to a respective one of said circuits, means for positioning receiving material in said atmospheric gap between the pointed discharge end of each discharge element and its cooperating attraction element, means for passing a cloud of reproducing material between said receiving material and the discharge ends of said discharge elements, a stationary light source, a support for mounting image copy having a transparent image area and an opaque non-image area in operative relationship to said light source, and means for projecting light from said source through the entire transparent image area of the image copy while stationary and onto said planular surface of said target in the form of light rays defining the configuration of the entire transparent image area to illuminate at the same instant certain of said light responsive devices to energize certain of said circuits and create electrostatic fields of force between each discharge element connected to an energized circuit and its cooperating attraction element to deposit the reproducing material at the same instant directly on the receiving material in the configuration of the entire transparent image area of the image copy.

5. An apparatus for reproducing images as defined in claim 4 and wherein said means for energizing said circuits selectively includes amplifiers in each of said circuits.

6. An apparatus for reproducing images as defined in claim 4 and wherein said means for energizing said circuits selectively includes a high voltage supply source connected to said circuits, relays controlling the energization of said circuits from said source, and electrical connections between said relays and said devices and including therein amplifiers.

7. An apparatus for reproducing images as defined in claim 4 and wherein said light sensitive electron emitting devices are in the form of buttons carried by said target and provided on their exposed surfaces with selenium coatings.

8. An apparatus for reproducing images as defined in claim 4 and wherein said target is adjustable toward and away from said means for projecting light rays thereon, wherefore the size of the reproduced image can be varied.

9. An apparatus for reproducing images as defined in claim 4 and wherein said means for projecting onto said target light rays in the configuration of the image to be reproduced includes means for reflecting light rays from said light source through said transparent image area of said image, and optical means for projecting the reflected light rays which have passed through said transparent image area onto said target.

10. An apparatus for reproducing images as defined in claim 4 and wherein the means for passing reproducing material through said gap includes an input pressure conduit, means operatively associated therewith for forcing the reproducing material through said conduit, an exhaust conduit, means for applying suction to said exhaust conduit, said conduits straddling the closely grouped needle-like discharge elements and provided with openings adjacent said elements, wherefore the reproducing material will be discharged from the input conduit into the gap and around said discharge elements while the excess thereof which is not deposited on the receiving material will be carried away through the exhaust conduit.

11. An apparatus for reproducing directly and instantly on receiving material entire complete images such as letters, numerals, characters, pictures and the like and which comprises a plurality of closely grouped needle-like discharge elements mounted with their discharge ends separated but closely grouped together in a predetermined arrangement over a planular area, a common planular attraction element coextensive with and parallel to said planular area and spaced from the discharge ends of said discharge elements with an atmospheric gap therebetween, an independent electrical circuit connected to each of said discharge elements, all of said circuits being connected to said common attraction element, means for electrically energizing at the same instant certain of said circuits to produce electrostatic fields of force between the discharge elements of said certain circuits and said common attraction element and including a target having a surface area provided with a multiplicity of individual light sensitive electron emitting devices corresponding in number to all of said circuits and grouped in an arrangement corresponding to that of said discharge elements, with each of said devices being correlated to a respective one of said circuits, means for positioning receiving material in said atmospheric gap and intermediate the discharge ends of said discharge elements and said common attraction element, means for passing a cloud of reproducing material through said gap intermediate said receiving material and said discharge elements, a stationary light source, a support for stationarily mounting image copy having a transparent image area and an opaque non-image area in operative relationship to said light source, and means for projecting light from said source through the entire transparent image area of the stationary image copy and onto said target in the form of light rays defining the configuration of the entire transparent image area to illuminate at the same instant certain of said light responsive devices to energize certain of said circuits and create electrostatic fields of force between certain of said discharge elements and said common attraction element to deposit the reproducing material at the same instant directly on the receiving material in the configuration of the entire transparent image area of the image copy.

References Cited in the file of this patent

UNITED STATES PATENTS

| | | |
|---|---|---|
| 853,755 | Belin | May 14, 1907 |
| 1,072,152 | Ocampo | Sept. 2, 1913 |
| 1,805,390 | Clark | May 12, 1931 |
| 1,817,098 | Ranger et al. | Aug. 4, 1931 |
| 1,941,001 | Hansell | Dec. 26, 1933 |
| 2,221,776 | Carlson | Nov. 19, 1940 |
| 2,277,013 | Carlson | Mar. 17, 1942 |
| 2,281,638 | Sukumlyn | May 5, 1942 |
| 2,297,691 | Carlson | Oct. 6, 1942 |
| 2,357,809 | Carlson | Sept. 12, 1944 |
| 2,473,729 | Salz | June 21, 1949 |
| 2,551,582 | Carlson | May 8, 1951 |
| 2,556,550 | Murray | June 12, 1951 |
| 2,583,546 | Carlson | Jan. 29, 1952 |
| 2,584,695 | Good | Feb. 5, 1952 |
| 2,691,345 | Huebner | Oct. 12, 1954 |

FOREIGN PATENTS

| | | |
|---|---|---|
| 241,636 | Great Britain | Oct. 26, 1925 |
| 606,130 | Great Britain | Aug. 6, 1948 |
| 606,133 | Great Britain | Aug. 6, 1948 |